United States Patent
Senkal et al.

(10) Patent No.: US 11,914,762 B2
(45) Date of Patent: Feb. 27, 2024

(54) CONTROLLER POSITION TRACKING USING INERTIAL MEASUREMENT UNITS AND MACHINE LEARNING

(71) Applicant: META PLATFORMS TECHNOLOGIES, LLC, Menlo Park, CA (US)

(72) Inventors: Doruk Senkal, Kirkland, WA (US); Sheng Shen, Shoreline, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/555,126

(22) Filed: Dec. 17, 2021

(65) Prior Publication Data

US 2022/0206566 A1    Jun. 30, 2022

Related U.S. Application Data

(60) Provisional application No. 63/131,242, filed on Dec. 28, 2020.

(51) Int. Cl.
*G06F 3/01* (2006.01)
*G06F 3/0346* (2013.01)
(Continued)

(52) U.S. Cl.
CPC ............ *G06F 3/012* (2013.01); *G06F 3/0346* (2013.01); *G06N 3/04* (2013.01); *G06T 7/70* (2017.01);
(Continued)

(58) Field of Classification Search
CPC ........ G06F 3/012; G06F 3/0346; G06F 3/011; G06N 3/04; G06N 3/0445; G06N 3/0454; G06N 3/08; G06T 7/70; G06T 2207/20084
See application file for complete search history.

(56) References Cited

U.S. PATENT DOCUMENTS 5,850,201 A     12/1998   Lasko-Harvill et al.
9,046,919 B2 *  6/2015    Niknejad ............... G06F 3/011
(Continued)

OTHER PUBLICATIONS

Invitation to Pay Additional Fees for International Application No. PCT/US2021/065026 dated Apr. 4, 2022, 12 pages.
(Continued)

*Primary Examiner* — Mihir K Rayan
(74) *Attorney, Agent, or Firm* — Morgan, Lewis & Bockius LLP

(57) ABSTRACT

A system having at least a first component and a second component positioned at different locations on a user's body (e.g., on the user's head and held on the user's hand). Each component includes at least one inertial measurement unit (IMU) configured generate measurements indicating acceleration and angular rate data. The generated measurements of the IMUs are used with ground truth information indicating the positions of the first and second component to generate a set of training data to train a neural network configured to predict a relative position between the first and second components based on IMU measurements received over a predetermined time period. Because the neural network is trained based upon movements of a human user, the neural network model takes into account physiological constraints of the user in determining how the set of potential positions of the different components may change over time, reducing potential error.

18 Claims, 9 Drawing Sheets

(51) Int. Cl.

| | | |
|---|---|---|
| *G06N 3/044* | (2023.01) | |
| *G06N 3/08* | (2023.01) | |
| *G06N 3/045* | (2023.01) | |
| *G06T 7/70* | (2017.01) | |
| *G06N 3/04* | (2023.01) | |

(52) U.S. Cl.
CPC .............. *G06F 3/011* (2013.01); *G06N 3/044* (2023.01); *G06N 3/045* (2023.01); *G06N 3/08* (2013.01); *G06T 2207/20084* (2013.01)

(56) References Cited

U.S. PATENT DOCUMENTS

| | | | |
|---|---|---|---|
| 9,268,136 B1 | 2/2016 | Starner et al. | |
| 2002/0024675 A1 | 2/2002 | Foxlin | |
| 2015/0309681 A1* | 10/2015 | Plagemann | G06F 3/0304 715/863 |
| 2017/0336882 A1* | 11/2017 | Tome | G06F 3/03547 |
| 2018/0024635 A1* | 1/2018 | Kaifosh | G06F 3/017 345/156 |
| 2018/0070864 A1* | 3/2018 | Schuster | A61B 5/7275 |
| 2019/0339766 A1* | 11/2019 | Erivantcev | G06F 3/0346 |
| 2020/0225738 A1 | 7/2020 | Erivantcev et al. | |
| 2020/0364901 A1 | 11/2020 | Choudhuri et al. | |
| 2021/0223858 A1* | 7/2021 | Barak | A63F 13/428 |
| 2022/0265168 A1* | 8/2022 | Wei | A61B 5/6824 |
| 2023/0132644 A1* | 5/2023 | Melim | G06N 20/00 345/156 |

OTHER PUBLICATIONS

Kratzer P., et al., "Prediction of Human Full-Body Movements with Motion Optimization and Recurrent Neural Networks," IEEE International Conference on Robotics and Automation (ICRA), May 31, 2020, pp. 1792-1798.

Song C., et al., "Sensor Fusion for Learning-based Tracking of Controller Movement in Virtual Reality," 27th European Signal Processing Conference (EUSIPCO), Sep. 2, 2019, pp. 1-5.

Wang B., et al., "Predicting Body Movement and Recognizing Actions: An Integrated Framework for Mutual Benefits," 13th IEEE International Conference on Automatic Face & Gesture Recognition (FG 2018), May 15, 2018, pp. 341-348.

Chen C., et al. "Ionet: Learning to Cure the Curse of Drift in Inertial Odometry," Thirty-Second AAAI Conference on Artificial Intelligence, Jan. 30, 2018, 9 pages.

Jamil F., et al., "Toward Accurate Position Estimation Using Learning to Prediction Algorithm in Indoor Navigation," IEEE International Symposium on Intelligent Signal Processing, 2009, 27 pages.

Jimenez A.R., et al. "A Comparison of Pedestrian Dead-Reckoning Algorithms using a Low-Cost MEMS IMU," IEEE International Symposium on Intelligent Signal Processing, Aug. 26-28, 2009, pp. 37-42.

Kok M., et al., "Using Inertial Sensors for Position and Orientation Estimation," Foundations and Trends in Signal Processing, vol. 11, No. 1-2, 2017, 157 pages.

Yan H., et al., "RoNIN: Robust Neural Inertial Navigation in the Wild: Benchmark, Evaluations, and New Methods," arXiv preprint arXiv:1905.12853, May 30, 2019, 14 pages.

International Search Report and Written Opinion for International Application No. PCT/US2021/065026 dated May 31, 2022, 17 pages.

International Preliminary Report on Patentability for International Application No. PCT/US2021/065026, dated Jul. 13, 2023, 13 pages.

* cited by examiner

Receive, over a time period, positional information from first IMU of first component located at first position on user's body, and second IMU of second component located at second position on user's body
610

Receive, over the time period, ground truth positional information of the first and second components generated by a ground truth sensor system
620

Train neural network model to predict relative position of first component to second component, using training data comprising measurements of first and second IMUs and ground truth information indicating component positions
630

FIG. 6A

CONTROLLER POSITION TRACKING USING INERTIAL MEASUREMENT UNITS AND MACHINE LEARNING

CROSS-REFERENCE TO RELATED APPLICATION

This application claims the benefit of U.S. Provisional Application No. 63/131,242, filed on Dec. 28, 2020, which is hereby incorporated by reference in its entirety.

FIELD OF THE INVENTION

This disclosure relates generally to artificial reality systems, and more specifically to position tracking for use in for artificial reality systems.

BACKGROUND

An artificial reality system, such as a virtual reality (VR), augmented reality (AR), and/or mixed reality (MR) system, may perform various functions based on a user's movements and/or positions of the user's body. For example, in a VR game, a user may be able to control the game by moving their head (e.g., to view different regions of a displayed virtual world) and hands (e.g., to cause an in-game character to perform certain actions). As the user of the artificial reality system moves their body, the system may determine positions of various portions of the user's body over time, and use the determined positional information to control the artificial reality environment.

Because position tracking using IMUs is performed by continually integrating the received measurements (e.g., integrating acceleration with respect to time to calculate velocity, and again to calculate position), IMU-based position tracking may suffer from accumulated error, as any measurement errors are accumulated over time, causing the difference between the determined position and the body's actual position to continually increase. This is also known as "drift error" or "drift", as the determined position may begin to drift farther away from the actual position over time.

SUMMARY

Embodiments are directed to a system having different components (e.g., headset, handheld controller, etc.) positioned at different areas of a user's body. Each component comprises at least one inertial measurement unit (IMU) configured generate measurements indicating acceleration and angular rate data of the component. The generated measurements of the IMUs are used as inputs to a trained neural network to predict a relative position between the different components of the system. The neural network is trained based upon training data comprising IMU measurement data generated by a user having the components positioned on their body moving their body, and ground truth information indicating absolute positions of the different components. Because the neural network model is trained based upon movements of a human user, the neural network model is able to take into account the physiological constraints of the user in determining how the set of potential positions of the different components may change over time, reducing potential error that may be caused by drift.

In some embodiments, a system comprising a first component and a second component is provided. The first component is configured to be positioned at a first portion of a user's body, and comprises at least a first IMU configured to generate first measurements indicating motion of the first component, while the second component is configured to be positioned at a second portion of the user's body, and comprises at least a second IMU configured to generate second measurements indicating motion of the second component, wherein a set of potential positions of the first component and the second component is determined by physiological constraints of the first portion and the second portion of the user's body. The system further comprises a controller configured to receive first measurements from the first IU and the second measurements from the second IMU, and to predict a position of the first component relative to the second component using a trained neural network model and the set of potential positions.

In some embodiments, measurements from the first and second IMUs are received over a predetermined period of time, and the predicted position of the first component relative to the second component is determined by predicting a motion of the first component relative to the second component over the predetermined period of time, and updating an initial position based upon the predicted motion. In some embodiments, the position of the first component relative to the second component predicted by the trained neural network corresponds to an expected position of the first component relative to the second component corresponding to a future time, and is determined based upon an expected motion of the first component relative to the second component over a future time period following the predetermined period of time.

In some embodiments, the system corresponds to an artificial reality system, where the first component corresponds to a headset or head-mounted device of the artificial reality system, and the second component corresponds to a device of the artificial reality system positioned on a hand or arm of the user, such as a handheld controller.

BRIEF DESCRIPTION OF THE DRAWINGS

FIG. 6A is a flowchart illustrating a process for training a neural network model to predict relative positions of components using IMUs, in accordance with one or more embodiments.

Figure 1A:
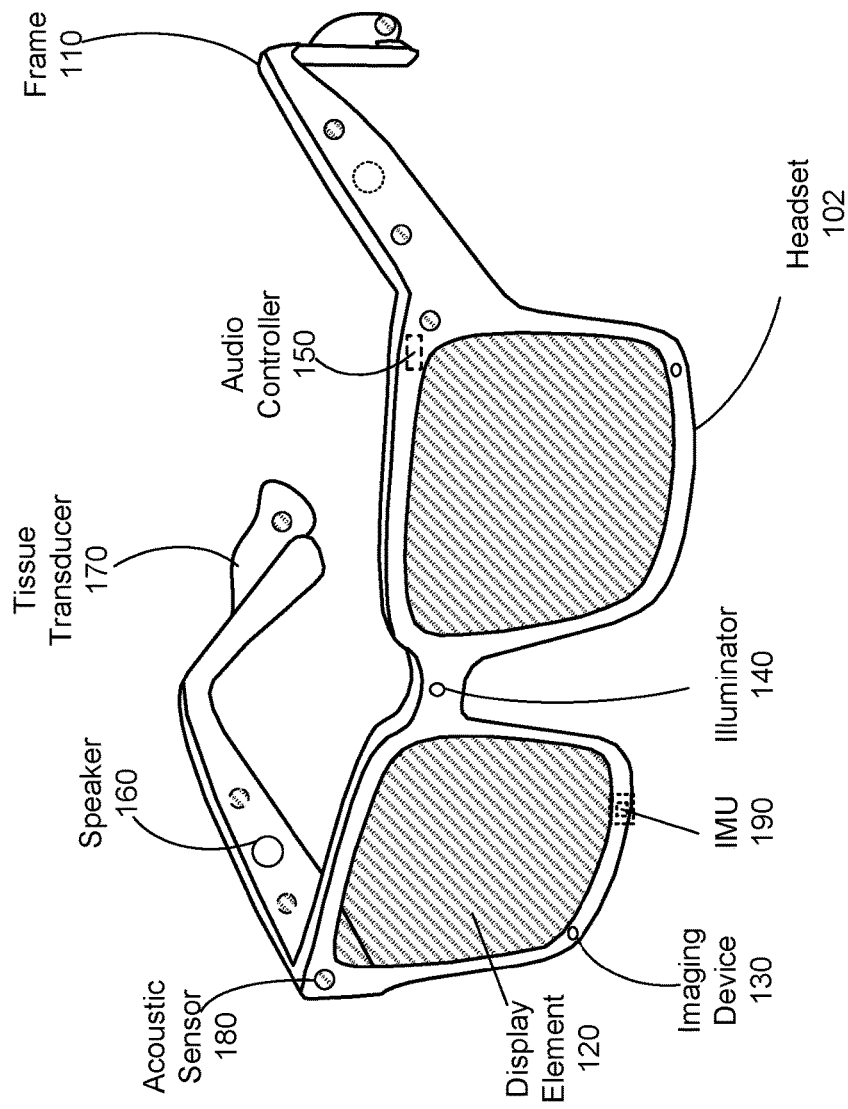
FIG. 1A is a high-level diagram of a system in which a position and orientation of the device is tracked using one or more IMUs, in accordance with some embodiments.
Figure 1A:
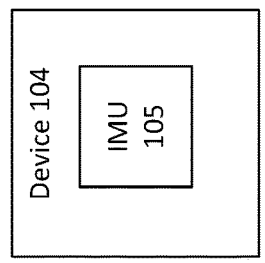

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Inertial measurement units (IMUs) are used in many position tracking applications to determine a position of a body. An IMU comprises at least an accelerometer and a gyroscope, and is configured to generate measurements indicating an acceleration (e.g., using the accelerometer) and an angular rate (e.g., using the gyroscope) of the body over time. These measurements may be used to determine changes in position or orientation of the body from an initial position and orientation, e.g., by integrating the angular rate to determine an angular offset from the initial angular position, and by integrating the measured acceleration to determine velocity, which in turn can be integrated to determine a spatial offset from the initial spatial position, in a process known as "dead reckoning" or "inertial navigation."

However, using IMUs for positional tracking may result in accumulated error. Because position is tracked by continually integrating acceleration with respect to time to calculate velocity and position (as well as integrating angular rate with respect to time to calculate angular position), any measurement errors are accumulated over time, causing the difference between the determined position and the body's actual position to continually increase. This is also known as "drift error" or "drift", as the determined position may begin to drift farther away from the actual position over time. For a constant angular rate and acceleration error, angular error will increase linearly (due to being determined by integrating angular rate), while spatial position error increases quadratically (due to being determined by integrating acceleration twice).

In some systems, in order to compensate for drift error, IMUs are used in conjunction with a second sensor system configured to determine a position of the body, in order to correct for the drift errors of the IMU. The second sensor system may comprise a positional tracking system such as a visual odometry system, a global positioning system (GPS), and/or the like. In some embodiments, because IMU drift error accumulates with time, in order to prevent the drift error of the IMU-based positioned tracking from exceeding a threshold amount, the second sensor system may be configured to generate positional data at least at a threshold frequency for correcting the drift error of the IMUs. For example, where the second sensor system comprises one or more cameras for capturing images of the tracked device and/or surrounding environment for position determination, one or more cameras may be configured to capture images at a relatively high frame rate, so that drift error can be corrected for at a predetermined frequency to maintain performance.

Embodiments described herein are directed to a tracking system that tracks portions of a user's body using IMUs and predicts positional information using a machine learning model or neural network model, in order to reduce or eliminate the need for a second sensor system for correcting drift error. In some embodiments, the tracking system comprises a first IMU on a first component and a second IMU on a second component. The first and second components are positioned at different portions of the user's body. For example, in some embodiments, the first component comprises a headset or head-mounted device (HMD), while the second component comprises a handheld device, such as controller held in the user's hand. The tracking system receives measurement data from the first and second IMUs and uses a trained machine learning model or neural network model to determine a relative position of the first component to the second component. For ease of discussion, further discussion below will refer to the user of a neural network model for predicting the relative positions of the first and second components, although it is understood that in other embodiments, a trained machine learning model may be used.

The trained neural network model may take into account physiological constraints of the human in predicting the relative position of the first and second components. For example, where the first component is positioned on the user's head, and the second component is positioned on the user's hand, the ways in which the position of the second component can change relative to the first component is constrained by human physiology. The neural network model receives measurements from the first and second IMUs, and is trained to predict the relative position of the first component to the second component given the IMU measurements received over a predetermined time period (e.g., past 1 second, past 10 seconds, etc.). Because the neural network model determines a current relative position based on a limited set of measurements from the first and second IMUs, and is trained based on movements of the human body, the drift error of the IMUs can be limited, reducing or eliminating a need to correct the position determined using the IMUs with a second sensor system. In some embodiments, the neural network model determines a current position based on a determined relative motion from a known starting position. However, even though drift error may accumulate when the neural network model is run in an iterative fashion, because the model takes into account human physiological constraints, the amount of drift error in comparison to conventional dead reckoning techniques may be greatly reduced. In some embodiments, the neural network model is used to determine the positions of the first and/or second components when at least one of the first or second component is unable to be tracked using vision-based tracking (e.g., if the user moves a handheld controller device outside the view of the vision tracking cameras, such as behind the head) for a period of time (e.g., 10-20 seconds), but is expected to return to a position where vision-based tracking can be resumed. During this "blind" period, the neural network model can be used to determine the relative positions of the components with greater accuracy and/or less accumulation of drift error.

In some embodiments, the neural network is configured to predict expected positions of the first and/or second components a certain period of time into the future, e.g., an expected future position of the second component relative to the first component, with limited change in accuracy. Predicting a future position of the first and/or second component may be performed for latency compensation purposes, e.g., to absorb latency induced by the entire tracking system (IMU data acquisition, wireless communication, processing, rendering etc.). For example, in a system in which a virtual object corresponding to a controller is rendered to the user in an augmented or virtual reality environment, the virtual object may be rendered at a position corresponding to where the controller will be expected to be, compensating for an expected level of latency or lag (e.g., 50 ms in the future, to compensate for an expected 50 ms of latency). A neural network model based approach can produce better future predictions compared to more rudimentary approaches that rely on extrapolating position changes based on last measured velocity/acceleration, as it can use the knowledge of trajectory over a past time period and how controller has moved in the past after such a trajectory, e.g., based upon patterns of movement of a human user, which are limited by physiological constraints of the human body. In some embodiments, because a latency level of the system may change over time, the neural network is configured to output, instead of relative position information for a specific future point in time, one or more coefficients of a function (e.g., a polynomial function) corresponding to an expected path over which the second component is expected to travel relative to the first component over a future time period. Thus, the same neural network model may be used to determine expected future positions for different amounts of latency.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a high-level diagram of a system in which a position of the device is tracked using one or more IMUs, in accordance with some embodiments. The system 100 comprises a plurality of devices, including a headset 102 and an additional device 104. Each of the plurality of devices may be configured to be positioned at respective portion of a body of a user. For example, in some embodiments, the headset 102 is worn on the user's head, while the device 104 may be worn at a different position on the user's body (e.g., strapped to the user's chest, leg, or arm, etc.). In other embodiments, the device 104 may be configured to be held in a hand of the user.

Figure 1B:
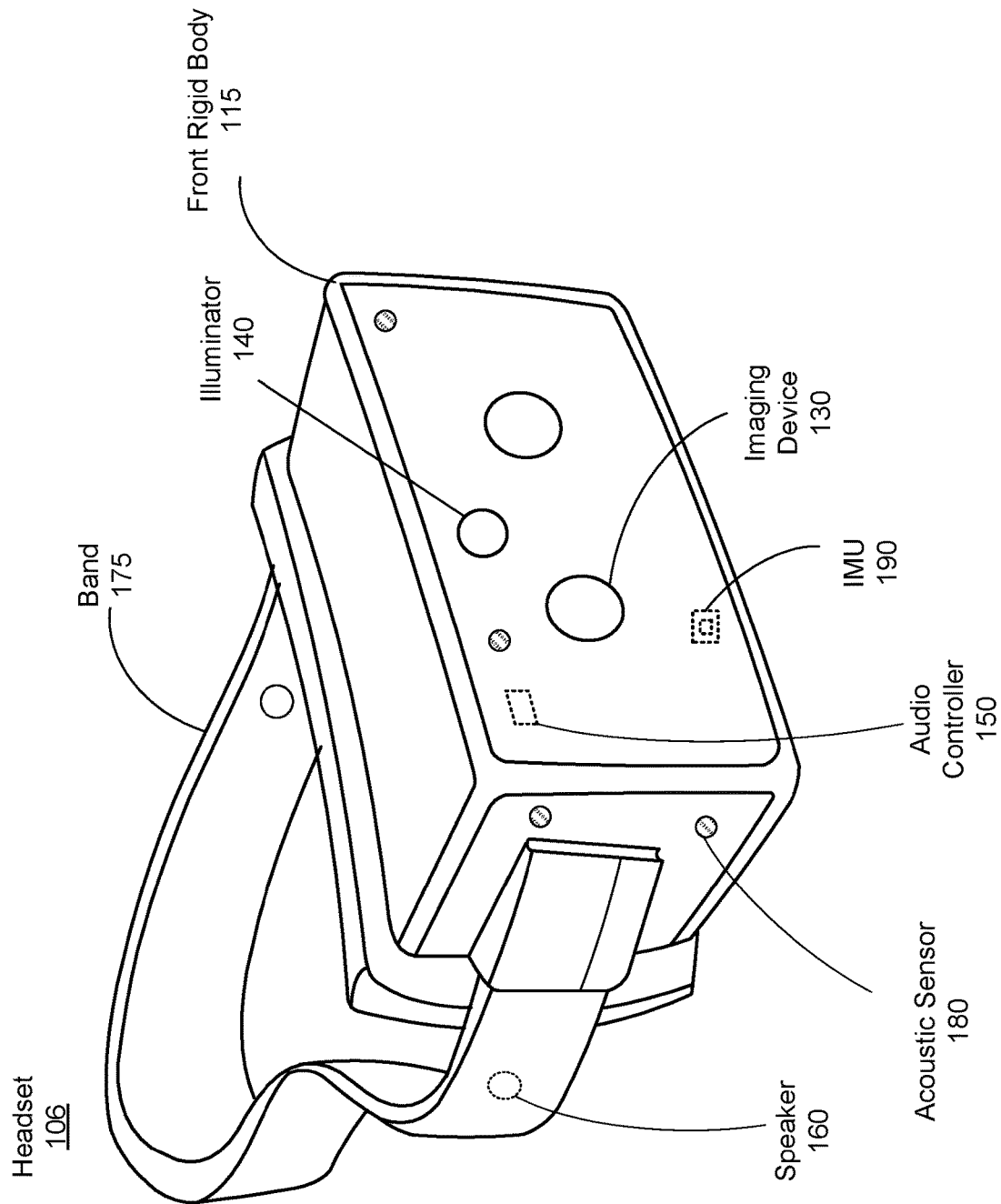
FIG. 1B is a perspective view of a headset implemented as a head-mounted display, in accordance with one or more embodiments.

The headset 102 may be implemented as an eyewear device, in accordance with one or more embodiments. In some embodiments, the headset 102 is a near eye display (NED). In general, the headset 102 may be worn on the face of a user such that content (e.g., media content) is presented using a display assembly and/or an audio system. However, the headset 102 may also be used such that media content is presented to a user in a different manner. Examples of media content presented by the headset 102 include one or more images, video, audio, or some combination thereof. The headset 102 includes a frame, and may include, among other components, a display assembly including one or more display elements 120, a depth camera assembly (DCA), an audio system, and an IMU 190. While FIG. 1A illustrates the components of the headset 102 in example locations on the headset 102, the components may be located elsewhere on the headset 102, on a peripheral device paired with the headset 102, or some combination thereof. Similarly, there may be more or fewer components on the headset 102 than what is shown in FIG. 1B.

The frame 110 holds the other components of the headset 102. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 102. As illustrated the headset includes a display element 120 for each eye of a user. In some embodiments, a display element 120 generates image light that is provided to an eyebox of the headset 102. The eyebox is a location in space that an eye of user occupies while wearing the headset 102. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 102. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 102. The local area is the area surrounding the headset 102. For example, the local area may be a room that a user wearing the headset 102 is inside, or the user wearing the headset 102 may be outside and the local area is an outside area. In this context, the headset 102 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 102. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 102 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 102. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 102, placed on an interior surface of the headset 102, separate from the headset 102 (e.g., part of some other component), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 102.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

Each of the headset 102 and the additional device 104 of the system 100 may comprise at least one inertial measurement unit (IMU). For example, as shown in FIG. 1A, the device 104 comprises an IMU 105, and the headset comprises an IMU 190. Each of the IMUs 105 and 190 includes at least one or more accelerometers and one or more gyroscopes configured to measure an acceleration and angular rate caused by movement of the device 104 or headset 102. In some embodiments, the device 104 or the headset 102 comprises a controller configured to determine positional information based upon measurements generated by the IMUs (e.g., using a neural network model configured to predict a relative position of the device 104 to the headset 102, discussed in greater detail below). In other embodiments, the neural network model is maintained on a separate console (not shown), and device 104 and the headset 102 are configured to transmit IMU measurements to the separate console which determines the positional information based on the received information using the neural network model.

As shown in FIG. 1A, the IMU 190 of the headset 102 may be located on a portion of the frame 110 of the headset 102, allowing for the one or more accelerometers and one or more gyroscopes of the IMU to measure an acceleration and angular rate caused by movement of the headset 102.

In some embodiments, the headset 102 and/or the device 104 may further comprise other types of sensors, such as one or more magnetometers, another suitable type of sensor that detects motion, a type of sensor used for error correction of the IMU, or some combination thereof. For example, in some embodiments, the headset 102 and/or the device 104 may include a pressure sensor or altimeter to measure a height of the headset and/or device, a gyroscopic sensor or a magnetometer to measure an orientation of the headset and/or device, an ultrasound rangefinder, an ultra-wideband sensor, and/or the like.

In some embodiments, the headset 102 may provide for simultaneous localization and mapping (SLAM) for a position of the headset 102 and updating of a model of the local area. For example, the headset 102 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the IMU 190 may be used to track the position (e.g., location and pose) of the headset 102 within the room. Additional details regarding the components of the headset 102 are discussed below in connection with FIG. 6.

FIG. 1B is a perspective view of a headset 106 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 106 includes many of the same components described above with reference to FIG. 1A, but modified to integrate with the HMD form factor. For example, the HMD includes a display assembly, a DCA, an audio system, and an IMU 190. FIG. 1B shows the illuminator 140, a plurality of the speakers 160, a plurality of the imaging devices 130, a plurality of acoustic sensors 180, and the IMU 190. The speakers 160 may be located in various locations, such as coupled to the band 175 (as shown), coupled to front rigid body 115, or may be configured to be inserted within the ear canal of a user.

In some embodiments, a user of an artificial reality system, in addition to wearing a head-mounted device such as the headset 102 of FIG. 1A or the headset 106 of FIG. 1B, may also be associated with one or more additional devices located at different positions on the user's body. For example, in some embodiments, the user may use a controller device to perform various actions within the artificial reality environment. In some embodiments, the controller device comprises a handheld controller held in the user's hand.

Figure 2:
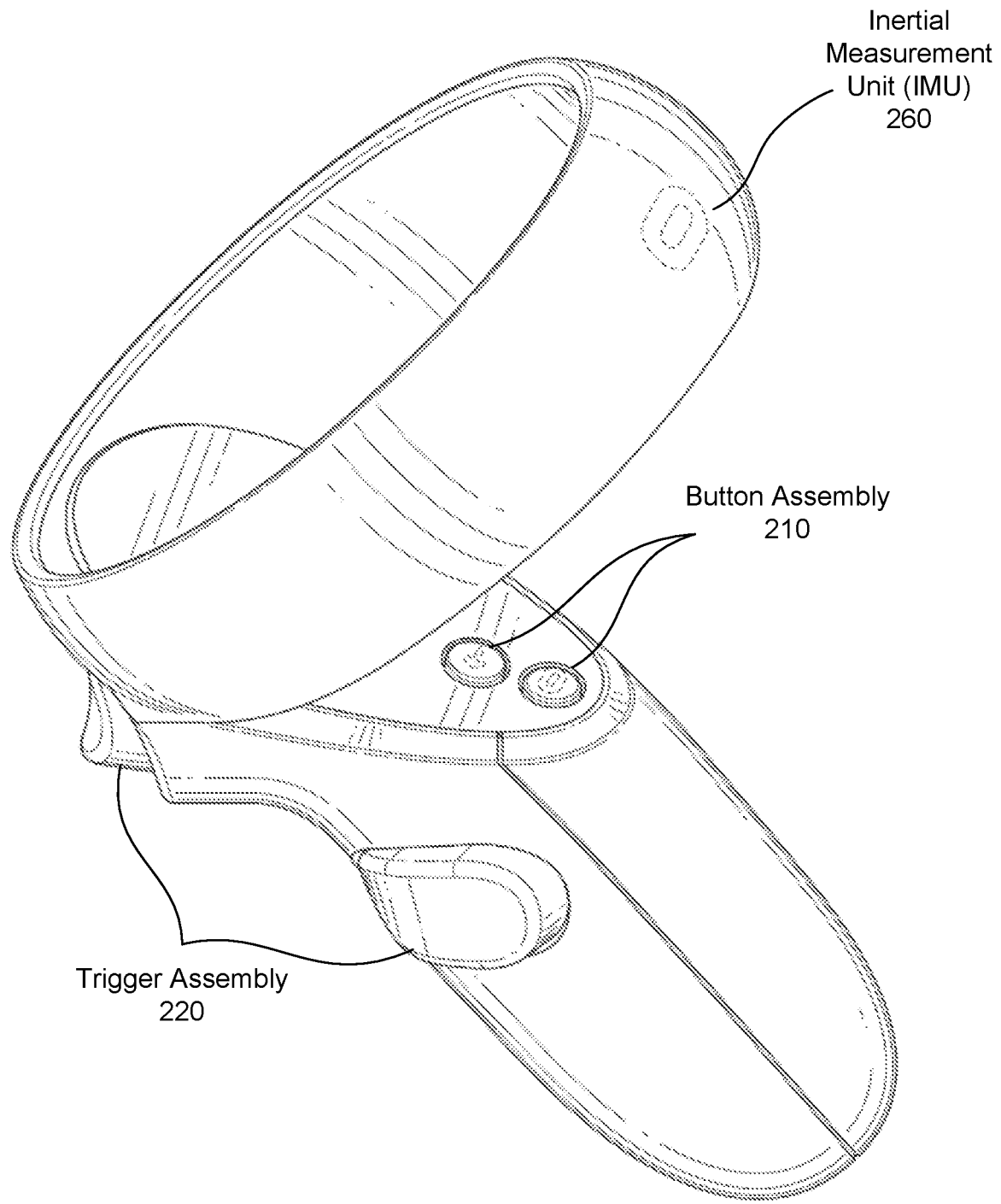
FIG. 2 is a side view of a handheld controller, in accordance with one or more embodiments.

FIG. 2 is a side view of a handheld controller 200, in accordance with one or more embodiments. The handheld controller 200 may be an embodiment of the device 104 illustrated in FIG. 1A, and is a controller device configured to be held in a hand of the user. The handheld controller 200 includes one or more interface elements configured to receive input from a user of the handheld controller 200, such as a button assembly 210, a trigger assembly 220, or a combination thereof. The user may use the interface elements to perform action requests and receive responses from a console of the system. An action request is a request to perform a particular action. For example, an action request may be an instruction to start or end capture of image or video data, or an instruction to perform a particular action within an application. The handheld controller 200 additionally comprises a position sensor corresponding to an IMU 260. The IMU 260 of the handheld controller 200 may be correspond to the IMU 105 illustrated in FIG. 1A. In other embodiments, the handheld controller 100 contains additional components than those listed, e.g., the handheld controller 200 may have additional interface elements, multiple IMUs 260, and/or other types of sensors. In the embodiment of FIG. 2, the handheld controller 200 is configured to operate with one hand of the user; however, in other embodiments, a second handheld controller with mirror symmetry in relation to the handheld controller 200 may be configured to operate with the other hand of the user.

The button assembly 210 contains one or more buttons that each receive input when at least partially depressed. Each button of the button assembly 210 translates along one or more axes. In some embodiments, a button translates along a single axis. Translation of a button along the one or more axes may correspond to various inputs. In one embodiment, a button only receives an input when the button is depressed by a threshold distance corresponding to a threshold translation of the button along an axis. In some embodiments, a button of the button assembly 210 may comprise a capacitive sensor capable of detecting a proximity of the user's skin to the button. The button assembly 210 may comprise a multitude of buttons each configured to receive one or more inputs. In one embodiment, the button assembly comprises one or more buttons configured as a directional pad (D-pad) with each button of the D-pad corresponding to a directional input.

The trigger assembly 220 contains one or more triggers that each receive input when depressed. Each trigger of the trigger assembly 220 is fixed at a point providing rotational movement of the trigger about the fixed point. In one embodiment, a trigger only receives an input when the trigger is rotated more than some threshold degree. In another embodiment, a trigger may detect a range of angular rotation of the trigger. In some embodiments, each trigger is a capacitive sensor capable of detecting a proximity of the user's skin to the trigger.

The IMU 260 is configured to generate one or more measurement signals in response to motion of the headset 102. The IMU 260 may correspond to the IMU 105 illustrated in FIG. 1A, and be located on a structure of the handheld controller 200, allowing for the one or more accelerometers and one or more gyroscopes of the IMU to measure an acceleration and angular rate caused by movement of the handheld controller 200. In some embodiments, the IMU 260 comprises a controller configured to determine positional information based upon measurements generated by the IMU. In other embodiments, the IMU 260 is configured to transmit sensor information (e.g., IMU measurements) to a separate device or console which determines the positional information of the handheld controller 200 based on the received information.

Figure 3:
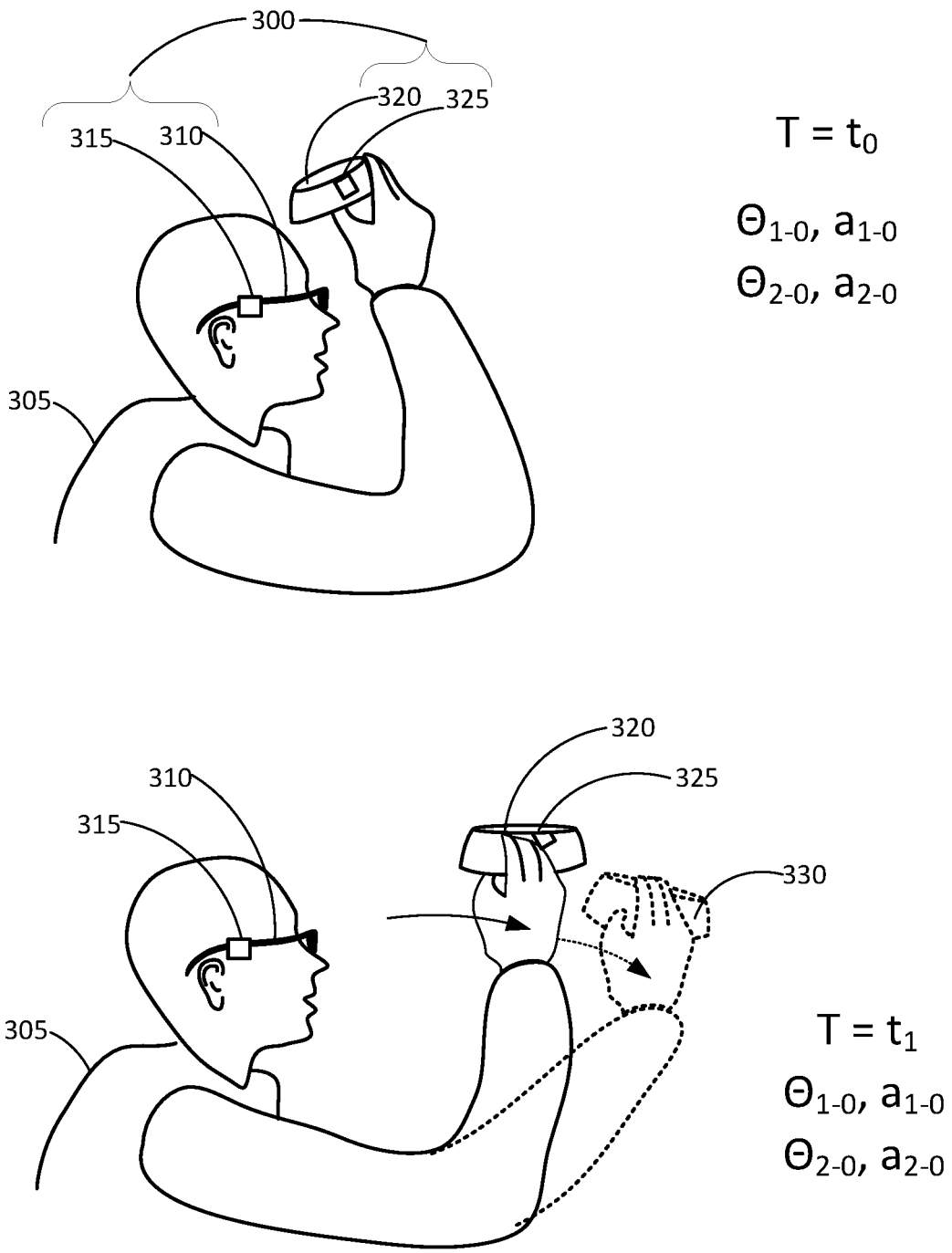
FIG. 3 is a diagram of a user using an artificial reality system configured to determine positional information using IMUs, in accordance with some embodiments.

FIG. 3 is a diagram of a user using an artificial reality system configured to determine positional information using IMUs, in accordance with some embodiments. As shown in FIG. 3, a user 305 of an artificial reality system 300 may have a plurality of components positioned at different portions of their body, including a first component corresponding to an HMD 310 worn on the user's head, and a second component corresponding to a handheld controller 320 held in the user's hand. The first component/IMID 310 and second component/handheld controller 320 may correspond to devices of the system 100 as illustrated in FIG. 1A, e.g., the HMD 310 corresponding to the headset 102 or 106 of FIG. 1A or 1B, and the handheld controller 320 corresponding to the device 104 of FIG. 1A or the handheld controller 200 of FIG. 2.

The HMD 310 comprises a first IMU 315, and the handheld controller 320 comprises a second IMU 325. It is understood that although FIG. 3 illustrates the user 305 having components positioned at certain parts of the user's body (e.g., head and hand), in other embodiments, the first and second components may correspond to other types of components of the artificial reality system positioned at other portions of the user's body. For example, in some embodiments, the user 305 may have a component containing an IMU strapped to the user's chest in addition to or instead of a component worn on the user's head or held in the user's hand. In some embodiments, the second component 320 may correspond to a watch or other component worn on the user's wrist instead of held in the user's hand. In some embodiments, at least one of the first or second component may correspond to a component strapped to the user's thigh or leg, e.g., an ankle bracelet.

In addition, in some embodiments, the artificial reality system 300 may comprise an external console (not shown) separate from the components positioned on the user's body. For example, in some embodiments the console is configured to receive data from the HMD 310 and/or handheld controller 320 (e.g., IMU measurements, action requests, etc.), and to provide content to the HMD 310 and/or handheld controller 320 responsive to the received data (e.g., visual or audio content to the HMD 310, haptic feedback to the handheld controller 320, etc.).

When components of the artificial reality system are attached to portions of the user's body (e.g., worn on the user's head and/or held in the user's hand as shown in FIG. 3), the movement and relative positions of the components are constrained by human physiology. For example, the possible positions of the HMD 310 are limited by the possible positions of the head of the user. For example, the user has a limited range of motion of their head which is constrained by, e.g., the range of motion of their neck relative to their torso. In addition, movement of the handheld controller 320 relative to the HMD 310 is constrained by the range of motion of the user's arm. For example, the maximum distance to which the handheld controller 320 may move from the HMD 310 is constrained based upon a length of the user's arm and neck. In addition, paths on which the handheld controller 320 is able to move relative to the HMD 310 will be limited based upon the degrees of freedom in which the user's arm can move. For example, when a user raises or lowers their hand by bending their forearm, the angular orientation of the handheld controller 320 held in their hand may change due to the rotation of the user's forearm, instead of remaining constant throughout the movement.

The first and second IMUs 315 and 325 measure angular rate and acceleration information of the HMD 310 and the handheld controller 320 over time, as the user moves their body when using the artificial reality system. For example, FIG. 3 illustrates that at a time $t_0$, the user 305 may be holding their arm out to the side. At the time $t_0$, the first IMU 315 may measure an initial angular rate $\theta_{1-0}$ and an initial acceleration $\alpha_{1-0}$, while the second IMU 325 measures an initial angular rate $\theta_{2-0}$ and an initial acceleration $\alpha_{2-0}$ (the first subscript corresponding to IMU, e.g., the first or second IMU, and the second subscript corresponding to time). At a later time (e.g., time $t_1$), the user 305 has moved their arm downwards, causing a change in the position and orientation of the handheld controller 320 relative to the HMD 310. At the time $t_1$, the first IMU 315 may measure an angular rate $\theta_{1-1}$ and an acceleration $\alpha_{1-1}$, while the second IMU 325 measures an angular rate $\theta_{2-1}$ and an acceleration $\alpha_{2-1}$. In some embodiments, the accelerometer and gyroscope of each IMU generates acceleration and angular rate data, which is sampled by the IMU to generate the IMU measurements (e.g., 100 samples per second). As discussed above, these rapidly-generated IMU measurements may be integrated over time to estimate the position and angular orientation of the HMD 310 and handheld controller 325. However, any errors in the IMU measurements may build up over time, causing "drift error."

In some embodiments, to limit the effects of drift error, the position of the first and second components (e.g., handheld controller 320 to the HMD 310) can be determined using a model constructed based upon the user's body, e.g., the user's arm. In other embodiments involving components positioned at other portions of the user's body, the model may be constructed based upon other portions of the user's body, such as the user's neck, torso, head, leg, etc. Because the model is based upon the structure of the user's body, physiological constraints of the user's body are considered when calculating the positions and orientation of the HMD and handheld controller, limiting the amount of drift error that can be accumulated. In some embodiments, the model may correspond to a default model, or may be customized from a default model to match a specific user. However, due to the large number of joints and degrees of freedom within the human body (e.g., within the human arm), manually constructing a model of portions the user's body and determining positions using the model may be impractical from a computational standpoint due to the number of potential calculations involved.

In some embodiments, a neural network model is trained to predict a relative position of the handheld controller 320 to the HMD 310 based on received IMU measurements. The neural network model is configured to receive measurements taken by the first and second IMUs over time, and, based upon the IMU measurements received over a predetermined time period (e.g., past 1 second, past 10 seconds, etc.), predict a relative position of the handheld controller 320 relative to the HMD 310. For example, in some embodiments, the neural network model uses a set of IMU measurements including a first set of measurements $(\theta_{1-0}, \alpha_{1-0})$, $(\theta_{2-0}, \alpha_{2-0})$ corresponding to time $t_0$, a second set of measurements $(\theta_{1-1}, \alpha_{1-1})$, $(\theta_{2-1}, \alpha_{2-1})$ corresponding to time $t_1$, and any intervening measurements, and predicts a motion of the handheld controller 320 relative to the HMD 310 between times $t_0$ and $t_1$. For example, in some embodiments, the neural network model may access a stream of IMU measurement data received from the HMD 310 and handheld controller 320, and, responsive to a signal to generate a prediction and/or at predetermined time intervals, uses a set of IMU measurements from the stream corresponding to a previous time period (e.g., between $t_0$ and $t_1$) to predict a motion of the handheld controller 320 relative to the HMD 310 over the time period. The predicted motion may be used to update a previously determined initial position to generate an updated position. In some embodiments, the neural network model may predict a set of potential relative positions between the handheld controller 320 and the HMD 310 based on the IMU measurements corresponding to the time period, which may be narrowed down to a specific position based upon the previously-determined initial position. In some embodiments, the neural network model may further receive initial position information (e.g., initial position, orientation and velocity information) as an input.

In some embodiments, a duration of measurements (e.g., time between $t_0$ and $t_1$) used by the neural network model to generate relative position data may be selected based upon the needs of the particular application, such as a period of time over which the neural network model is expected to be used determine the relative position of the first/second components (e.g., a maximum expected duration in which the controller moves within a "blind zone" during which the position of the controller cannot be determined using visual tracking techniques). In some embodiments, the system maintains multiple neural network models trained based upon different sequence lengths, which dynamically selects a model during runtime based upon application needs.

In some embodiments, the neural network model is further trained to determine changes in relative angular position (relative orientation). For example, the model may be trained against relative orientation changes of the controller with respect to the headset. In some embodiments, orientation can be represented using Euler Angles (3 parameters or 3×1) or Quaternion notation (4 parameters or 4×1). In some embodiment, the neural network model is trained to predict position and orientation simultaneously, e.g., the network is trained against a position+orientation ground truth (6×1 or 7×1 parameters).

In some embodiments, a frequency at which the neural network model predicts relative motion/position of the first and second components, and a time period analyzed by the neural network model to generate each position are configurable. For example, in some embodiments, the neural network model may be instructed to generate relative motion/position predictions more frequently if a previously predicted relative motion exceeds a threshold amount, in order to generate more granular predictions. In some embodiments, the length of a time period analyzed by the neural network model may be based upon a frequency of prediction, or be independent from the prediction frequency (e.g., the neural network model may be configured to generate a prediction each second, each prediction based on a previous 10 seconds of IMU data of the first and second components).

In some embodiments, the neural network model is maintained on an external console (not shown) separate from the HMD 310 and the handheld controller 320. For example, each of the first and second IMUs 315 and 325 may generate measurement samples over time, and transmit the generated measurements to the external console to be fed to the neural network model maintained on the external console. The neural network model receives the generated IMU measurements, and predicts a relative motion of the HMD 310 and handheld controller 320, from which the relative positions of the HMD 310 and the handheld controller 320 can be determined. In other embodiments, the neural network model may be maintained on the HMD 310 or the handheld controller 320.

In some embodiments, the console may use the determined positional information to generate content to be presented to the user 305 (e.g., visual content to be displayed to the user through a display of the HMD, audio content to be provided to the user through an audio system of the HMD, haptic feedback to be provided through the handheld controller, etc.). For example, in some embodiments, the artificial reality system may analyze the relative position of the second component 320 to the first component 310 to identify one or more movements or gestures corresponding to action requests, and cause the requested actions to be performed in the artificial reality system.

In some embodiments, the neural network model is initially trained using training data obtained by instructing a training user (e.g., the user 305) having first and second components positioned on their body (e.g., wearing the HMD 310 and holding the handheld controller 320) to perform a variety of movements over time (e.g., moving their arms and/or head to cause changes in the relative positions of the HMD 310 and handheld controller 320), during which measurements from the first and second IMUs are received. The IMU measurements are used to train the neural network model in conjunction with ground truth information indicating positions of the first and second components generated in parallel with the IMU measurements (e.g., using a second sensor system). Once the neural network model is trained, the system may be used by an end user, during which the trained neural network model may be used to predict relative positions of the first and second components.

The training may take place in an environment where accurate ground truth information can be obtained in parallel with the measurements of the IMUs of the first and second components. For example, in some embodiments, the training user may be located within a room having a camera system comprising one or more cameras configured to capture images of the first and second components positioned at different portions of the user's body. As the training user moves their body, the cameras capture images of first and second components, and uses the captured images to determine positional information of the first and second components. In some embodiments, each component may comprise one or more locators located at specific positions of the component. Each locator may be a light emitting diode (LED), a corner cube reflector, a reflective marker, a type of light source that contrasts with an environment in which the artificial reality system operates, or some combination thereof. In embodiments where the locators are active (i.e., an LED or other type of light emitting device), the locators may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof. In embodiments where the locators are passive, the locators may reflect light in the visible band, in the infrared (IR) band, in the ultraviolet band, some other portion of the electromagnetic spectrum, or some combination thereof. As the one or more cameras capture images of the first and second components, the camera system may analyze the captured images and identify locations of the locators within the captured images to determine a position and/or orientation of each component. In some embodiments, the training user may be prompted to perform certain types of motions with their head and/or arms, or to perform certain actions within an application (e.g., for a gaming system, the training user may be instructed to play the game with the device).

In other embodiments, the ground truth information may be generated by a different sensor system, such as a DCA implemented as part of each of the first and second components and configured to determine a position for each component, from which the relative positions of the first component and the second component can be determined. For example, in embodiments where the first component 310 corresponds to the headset 102 of FIG. 1A, the DCA (e.g., comprising the illuminator 140 and imaging devices 130) may be used to determine positional information for the first component 310.

By comparing the IMU measurement information received over time with the ground truth information determined using another sensor system (e.g., camera system or other type of sensor system), the neural network model is trained to predict the relative position of the handheld controller 320 relative to the HMD 310 for a human user. Because the set of potential positions of the first and second components in the training data are subject to physiological constraints of the user's body, the neural network is trained to predict the relative position of the first and second components subject to the physical structure of the human body. For example, the amount of error of the relative position between the HMD 310 and the handheld controller 320 may be limited or capped due to the physical constraints of the human body. In addition, because the joints of the human body have certain ranges of motion, the user may move the handheld controller 320 relative to the HMD 310 more naturally along certain trajectories, which may be recognized by the neural network during the training process.

The neural network model limits an amount of error when determining the relative positions of the first and second components. As such, in embodiments where a second sensor system is used to periodically correct the position determined using the IMUs for drift error, position determination by the second sensor system may be performed with reduced frequency and/or less precision. For example, in embodiments that use a camera system to determine absolute positions of the first/second components, the rate of position determination may be reduced. In addition, the second sensor system may be configured to operate at lower power and/or lower precision (e.g., the camera system may capture lower resolution images for determining position and/or comprise fewer cameras compared to that used for training the neural network model), while the error of the relative positions as determining using the IMUs is maintained to be below a threshold amount. For example, when predicting relative positions of the first/second components using a neural network model, a camera system may be operated at a frame rate that is several times lower in comparison to systems that simply integrate received IMU measurements to perform positional determination. In some embodiments, a frequency at which positional information from the second sensor system is used to correct for error of positions based upon the IMUs is configured to not exceed a predetermined amount, e.g., from 30-60 Hz to 1 Hz or lower.

In some embodiments, the neural network model may allow for the relative positions of the HMD 310 and handheld controller 320 to be determined entirely using the first and second IMUs 315 and 325 (e.g., without the need for a second sensor system). Because the neural network model limits the amount of potential error of the relative position between the first and second components (e.g., due to the physical constraints of the human body), determination of relative positions between the components can be performed based upon only the IMU measurements while maintaining at least a threshold level of accuracy, without suffering from the problem of ever-increasing drift error.

In some embodiments, the neural network model may be used to compensate for loss of tracking in a second sensor system. For example, in systems that use a camera system to determine positions of the first and second component based on captured images (e.g., by detecting the positions of locators on each component in the captured images), tracking can be lost if the first or second component (or the locators thereon) are obscured from a camera of the camera system (e.g., due to being covered by the user or by other objects). In some cases, loss of tracking may cause objects in the artificial environment the depend upon the determined positions of tracked component to fly away (e.g., due to the determined position going to infinity due to lost tracking), which may be abrupt and jarring to the user. The neural network model may be used to predict the relative positions of the first and second components when tracking is lost. For example, the system may compare the relative positions predicted using the neural network model with positions determined by the second sensor system to assess whether the positions or motions of the first and second components determined by the second sensor system reflect realistic motion (e.g., do not "fly away" or go to infinity, do not move at an unrealistic speed), and, if not, display content to the user based upon the relative positions determined by the neural network model and IMUs instead of the second sensor system until tracking can be reestablished, potentially improving user experience.

In some embodiments, the neural network model may determine the relative positions of the HMD 310 and handheld controller 320 using inputs from the first and second IMUs 315 and 325, as well as one or more additional sensors. For example, as discussed above, additional sensors may include a sensor to measure a height of the HMD or handheld controller (e.g., an altimeter), or an orientation of the HMD or handheld controller (e.g., a magnetometer or gyroscopic sensor), etc. In some embodiments, the additional sensor data may be used by the neural network to further refine the relative position information determined based on the IMU measurements, allowing for more accurate position determinations without the use of the second sensor system (e.g., camera system).

In some embodiments, in addition to or instead of predicting relative position changes for the last time step in the sequence (e.g., corresponding to a current relative position), the neural network model is trained to predict a relative position a certain period of time into the future, e.g., for latency-compensation purposes. For example, as illustrated in FIG. 3, the neural network may be trained to predict an expected location 330 of the handheld controller 320 relative to the HMD 310 a set amount of time into the future (e.g., a set amount of time after $t_1$). In some embodiments, the neural network model outputs data indicating a position offset of the expected future location 330 from an initial position of the handheld controller 320 at a beginning of the analyzed time period (e.g., $t_0$), or from a current position of the handheld controller 320 (e.g., position at $t_1$).

In some embodiments, the neural network model is trained to predict the expected future position of the handheld controller 320 corresponding to an amount of time based upon an expected amount of latency is known. In this way, the predicted future position of the controller may be used to eliminate "perceived" latency or lag (e.g., by rendering a virtual object at the expected future position, performing some control function based on the expected future position, etc.). The neural network is able to take into account the physiological constraints of the user, and is trained based upon patterns of human motion, allowing for the expected future position to be predicted with greater accuracy in comparison to simply extrapolating the expected future position based upon a last measured velocity/acceleration.

Figure 4:
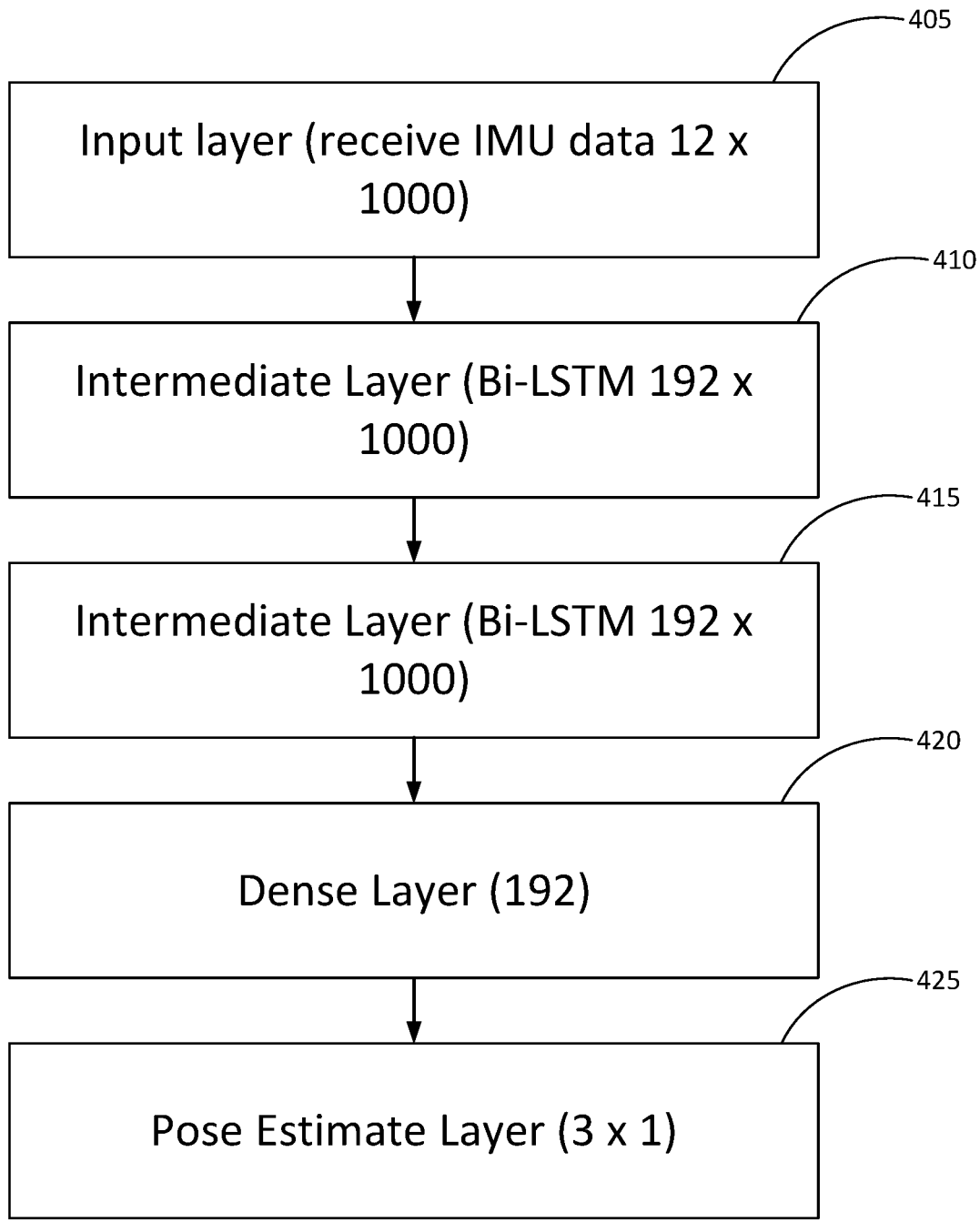
FIG. 4 is a diagram of a neural network model that may be trained to predict relative positions of components of an artificial reality system, in accordance with some embodiments.

In some embodiments, a neural network trained for future prediction requires no architectural change in comparison to a neural network trained to estimate a current position (e.g., neural network model 400 illustrated in FIG. 4). Instead, when training the neural network, the ground truth position data corresponding to x ms after a last time step of the input data may be used, instead of or in addition to current position ground truth.

FIG. 4 is a diagram of a neural network model that may be trained to predict relative positions of components of an artificial reality system, in accordance with some embodiments. The neural network model 400 may be stored and maintained on a console in communication with the first and second components containing the first and second IMUs (e.g., IMUs 315 of 325 of FIG. 3), on the first component or the second component (e.g., a headset or HMD, and/or a handheld controller), or some combination thereof. The neural network model 400 comprises a plurality of layers, including an input layer 405, at least one intermediate layer (e.g., intermediate layers 410 and 415), a dense layer 420, and output pose estimate layer 425.

The input layer 405 is configured to receive IMU measurement data from at least a first IMU and a second IMU. In some embodiments, the first and second IMUs may correspond to a headset or HMD and a handheld controller respectively (e.g., IMU 315 of the HMD 310, and IMU 325 of the handheld controller 320, as illustrated in FIG. 3). In some embodiments, the IMUs corresponds to a plurality of channels of data (e.g., 12 channels). For example, in some embodiments, each IMU has 6 channels (e.g., 3 for gyro, and 3 for accel X/Y/Z), and the system comprises two IMUs (e.g., one on the headset, and one on the handheld controller). In other embodiments, a different number of channels may be used (e.g., if only accelerometer data is used, then only 6 channels would be needed). In other embodiments, the system may comprise additional IMUs, and the input layer is configured to receive a greater number of channels. For example, the headset or controller may comprise additional IMUs (e.g., increasing the number of channels to 18 or more). In some embodiments, there may be separate left and right controllers, each having a respective IMU. In some embodiments, there can be additional sensors at different locations, e.g., elbow, chest, leg IMU.

In some embodiments, the input layer 405 may also receive additional inputs from other sensors. For example, in addition to raw IMU measurements generated by the first and second IMUs, the input layer 405 may receive additional parameters such as an initial position (if known), one or more velocity parameters (e.g., obtained by integrating IMU acceleration data over a time period, or from one or more additional sensors), orientation information (e.g., generated by fusing accelerometer and gyroscopic information to obtain an orientation vector with respect to gravity), etc.

In some embodiments, the input layer is configured to receive batches of input sequences corresponding to IMU measurements generated over a time period of up to a predetermined length. For example, in some embodiments, the IMUs are configured to generate, for each second of data, 100 samples. The input layer 405 may contain sufficient channels to receive up to a certain number of IMU samples corresponding to a predetermined time period, such as 10 seconds, resulting in input layer 405 receiving 1000 samples at a time (e.g., 12×1000 channels).

The neural network model 400 further comprises a plurality of intermediate layers. For example, FIG. 4 illustrates a first intermediate layer 410 and a second intermediate layer 415. In some embodiments, each intermediate layer comprises a plurality of long short-term memory (LSTM) units configured to, when unrolled, match a length of an IMU input sequence received at the input layer 405. For example, in an embodiment where the input layer is configured to receive up to 1000 samples at a time, each intermediate layer represents a number of LSTM cells (e.g., 192 LSTM cells) each unrolled 1000 times. In some embodiments, the number of LSTM cells is selected based upon a complexity of the problem (e.g., to achieve a balance between computational efficiency and performance). In addition, although FIG. 4 illustrates the intermediate layers of the neural network model 400 as comprising LSTM cells, it is understood that in other embodiments, other types of neural network nodes, such as Recurrent Neural Network (RNN) units, Gated Recurrent Units (GRU), etc. may be used.

In some embodiments, the plurality of intermediate layers includes a first intermediate layer 410 configured to return intermediate sequences, and a last intermediate layer (e.g., second intermediate layer 415) configured to return final values corresponding to a last unrolling step for each LSTM (e.g., 192×1).

In some embodiments, the neural network model 400 further comprises a dense layer 420. The dense layer 420 is configured to receive an output of the final intermediate layer (e.g., second intermediate layer 415) corresponding to a last unrolling step value for each LSTM, and maps the received values to the pose estimate layer 425.

The neural network model 400 further comprises a pose estimate layer 425 configured to receive an output of the dense layer 420 and generate position change (e.g., x, y, z position change) indicating a relative motion of the second component relative to the first component over the analyzed time period (e.g., 10 seconds). For example, in some embodiments, the pose estimate layer 425 returns a 3×1 vector of 3 numbers, either a floating point vector or integer vector corresponding to X, Y and Z position delta in 3-D space, e.g., [0, 1, −2.5], would mean 0 cm in X, 1 cm, in Y and 2.5 cm in −Z direction. It is understood that in other embodiments, different representations of position and/or orientation can be used, e.g., cartesian, cylindrical or spherical coordinate systems for delta position or, Euler angles, axis-angle representation or Quaternion notation for relative orientation.

In some embodiments, the position information generated by the pose estimate layer 425 indicates a position change of the second component (e.g., hand controller) relative to the first component (e.g., HMD), in a coordinate system of the first component (e.g., a head coordinate system or HMD coordinate system). In some embodiments, determining relative position in terms of the user's head coordinate system instead of a room coordinate system or global coordinate system may improve the accuracy of the neural network model in predicting the relative positions, as the user's head coordinate system is able to more accurately account for the physiological constraints of the user's body. For example, when a user performs a particular arm motion, the physiological constraints of the user's body may be the same regardless of which direction the user is facing when performing the motion. In some embodiments, the neural network model may receive input information corresponding to a sensor (e.g., IMU) on the user's body or torso, and predict the position of the hand controller using a body or torso coordinate system instead of a head coordinate system. In some embodiments, the position of the hand controller may be predicted relative to a modified head coordinate system that is constrained along one or more axes. For example, in some embodiments, the user's modified head coordinate system is constrained such that the z-axis remains aligned with a gravity vector, even if the user tilts their head (e.g., where the gravity vector is determined using a gyroscopic sensor on the HMD worn by the user).

Although FIG. 4 illustrates the neural network model using intermediate LSTM layers, it is understood that in other embodiments, other types of NN architectures, such as Gated Recurrent Unit Network (GRU), Recurrent Neural Network (RNN), Convolutional Neural Network (CNN) Architectures and their combinations, may be used.

Figure 5:
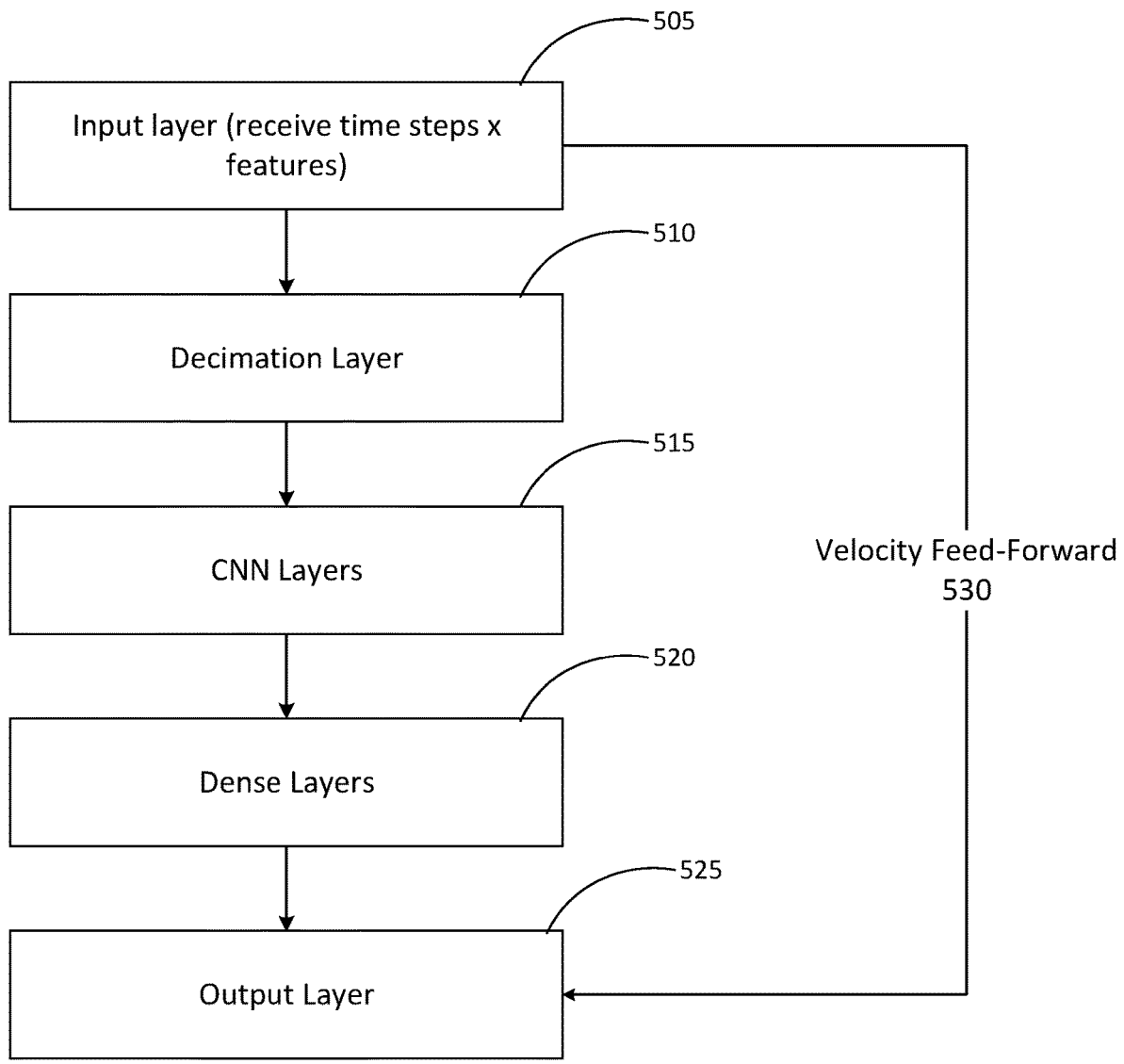
FIG. 5 is a diagram of another neural network model that may be trained to predict relative positions of components of an artificial reality system, in accordance with some embodiments.

FIG. 5 is a diagram of another neural network model that may be trained to predict relative positions of components of an artificial reality system, in accordance with some embodiments. In contrast to the LSTM-based neural network illustrated in FIG. 4, the neural network 500 illustrated in FIG. 5 is based on a CNN architecture. In some embodiments, the neural network model may be trained to perform position tracking (e.g., predicting relative position changes for the last time step in the sequence) and/or, as discussed above, future position prediction/latency compensation.

Similar to the neural network model 400, the neural network model 500 may be stored and maintained on a console in communication with the first and second components containing the first and second IMUs (e.g., IMUs 315 of 325 of FIG. 3), on the first component or the second component (e.g., a headset or HMTD, and/or a handheld controller), or some combination thereof. The neural network model 500 comprises a plurality of layers, including an input layer 505, decimation layer 510, CNN layers 515, dense layers 520, and one or more output layers 525. In some embodiments, the neural network model may further comprise a feed forward path 530.

The input layer 505 is configured to receive batches of input sequences corresponding to IMU measurements generated over a time period of up to a predetermined length. For example, in some embodiments, the input layer 505 is configured to receive sets of input sequences corresponding to a set number of time steps (e.g., 128 time steps at a time). Each input sequence corresponding to a particular time step may comprise a plurality of features, such as a time stamp, IMU measurement data (e.g., linear acceleration parameters, angular acceleration parameters) from at least a first IMU and a second IMU (e.g., corresponding to a headset or HMD and a handheld controller, respectively). In addition, in some embodiments, similar to as discussed above in relation to FIG. 4, the input layer 505 may also receive additional inputs from other sensors. For example, the plurality of features included in the input sequence may, in addition to include IMU measurements generated by the first and second IMUs, include one or more position parameters (e.g., based upon a previous position determination, or generated using a second sensor system, such as a camera system, if available), one or more orientation parameters (e.g., based upon a previous orientation determination, or generated using a separate sensor, such as a gyroscopic sensor, magnetometer, etc.), one or more velocity parameters (e.g., generated by integrating IMU acceleration data over a previous time period, or generated using a separate sensor), or some combination thereof. In some embodiments, the input layer 505 may compute one or more additional parameters not received as part of the input sequence (e.g., integrating a plurality of previously received IMU acceleration parameters to determine a velocity parameter).

In some embodiments, the neural network model 500 performs decimation on the received input sequences at a decimation layer 510. For example, in some embodiments, input sequence data may be received at a first rate (e.g., at 500 samples per second, or 500 Hz). However, the neural network model 500 may be able to produce results of a sufficient accuracy using samples produced at a second, slower rate (e.g., between 50 and 100 Hz). As such, the neural network 500 may use the decimation layer to decimate the received samples by a specified amount, e.g., by averaging sets of consecutive sample to generate a smaller number of aggregated samples. For example, in some embodiments, the decimation layer 510 is configured to average sets of 8 consecutive samples or 16 consecutive samples to generate a smaller number of samples, e.g., decimating a received set of samples corresponding to 128 time steps to aggregated samples corresponding to 16 time steps or 8 time steps.

The CNN layers 515 correspond to a multi-layer CNN model. For example, in some embodiments, the CNN layers 515 may correspond to a 7-layer CNN, where each layer includes batch normalization, and a rectified linear unit (ReLu), and generates one or more features from the received set of input sequences, e.g., encoded information relating to motion of the first and/or second IMUs in a tensor format.

The dense layers 520 may comprise a first dense layer corresponding to a non-linear activation function with ReLu and dropout, and a second fully-connected dense layer with no ReLu or dropout. In some embodiments, the dense layers 520 are configured to receive an output of a final CNN layer, and map the received values to the output layer 525.

The output layer 525 receives an output of the dense layers 520 and generates pose information, which may include position change information (e.g., x, y, z position change), orientation information, or a combination thereof. In embodiments where the neural network is performing position tracking, the position information may indicate a distance travelled within the analyzed time window (e.g., between $t_0$ and $t_1$). On the other hand, if performing future position prediction or latency compensation, the position change information indicates a distance the second component is expected to travel during a future time period (e.g., 50 ms after $t_1$). For example, in some embodiments, the output layer 525 returns a 3×1 vector of 3 numbers, corresponding to X, Y, and Z position delta in 3-D space, indicating a distance and direction that the second component is expected to travel during the future time period. In some embodiments, the output layer 525 may return a 6×1 vector or a 7×1 vector corresponding to position and orientation. In other embodiments, other formats for expressing position and/or orientation information may be used (e.g., a 12×1 vector or 3×4 array corresponding to 3×1 position information and 9×1 rotation matrix expressing orientation information). In some embodiments, the output vector may indicate a coordinate in a head coordinate system of the user.

In some embodiments, the output layer 525 comprises a first encoder layer that outputs a set of coefficients for a position determination function, and a second output layer that outputs the final position information. The position determination function is a function indicating an expected path of the second component over a future time period. For example, in some embodiments the position determination function is a cubic polynomial function of a time that outputs a three-dimensional pose vector, having coefficients corresponding to bias/position, velocity, acceleration, and jerk. In some embodiments, the polynomial function may be divided into three polynomial functions corresponding to X, Y, and Z coordinate axes. As such, the encoder layer may output a set 12 coefficients (e.g., corresponding to bias/position, velocity, acceleration, and jerk coefficients for each function). In some embodiments, the output coefficients may also include coefficients for a function for determining orientation information.

In some embodiments, the output layer 525 determines coefficients for a position determination function to allow for position information to be determined for a range of future time steps. This is because the latency values of a system may not be known beforehand, and may change based on how the system is being used (e.g., based on a particular application that the user is using). For example, if the user is using the first and second components to navigate a menu that is not very graphics intensive, latency may be low. On the other hand, if the user is using the first and second components to play a graphically-intensive game, latency may be higher. In some embodiments, the neural network 500 is trained using information corresponding to a range of latency values (e.g., between 10 and 100 ms of latency).

The second output layer receives the coefficients generated by the encoder layer, and determines position information for one or more time steps using the position determination function. In some embodiments, the second output layer receives a specific latency value, and determines position information corresponding to a time step corresponding to the received latency value. In other embodiments, the second output layer uses the position determination function to generate a plurality of positions corresponding to a plurality of time steps, e.g., to be used by another processing element to select a specific position based upon a specific latency value.

In some embodiments, the neural network model may, in addition to outputting relative position information of the second component, also be trained to output orientation information. In other embodiments, orientation information may instead be determined using one or more additional sensors, such as by fusing accelerometer and gyroscopic information obtain an orientation vector with respect to gravity, using a magnetometer to determine magnetic north, and/or the like.

In some embodiments, the neural network 500 includes a velocity feed-forward path 530. As discussed above, a simple way of predicting a future relative position of a component (e.g., controller) is to extrapolate a current velocity of the component multiplied by an expected time value (e.g., latency value). In some embodiments, the neural network model 500 receives current velocity information as part of an input sequence at the input layer 505, or determines a current velocity using received acceleration information, and uses the velocity information to determine an extrapolated relative position to be used as a baseline for predicting an expected future position of the component. In some embodiments, the neural network 500 may further take into account a current acceleration when extrapolating the expected relative position of the component. In some embodiments, the neural network feeds forward the velocity (and/or acceleration) information via the velocity feed forward path 530, to be extrapolated at a later layer (e.g., by the output layer 525).

In some embodiments, the neural network 500 is trained to use the extrapolated relative position as a baseline value when predicting an expected future relative position. In some embodiments, the neural network 500 is trained to predict an offset of the future relative position from the extrapolated relative position. For example, the output layer 525 may determine an output of the position determination function that corresponds to an offset from an extrapolated position, where the extrapolated position is received via the velocity feed forward path 530 or determined based on velocity information received via the feed forward path 530. The output layer 525 applies the predicted offset to the extrapolated relative position to determine a final relative position prediction.

Figure 6B:
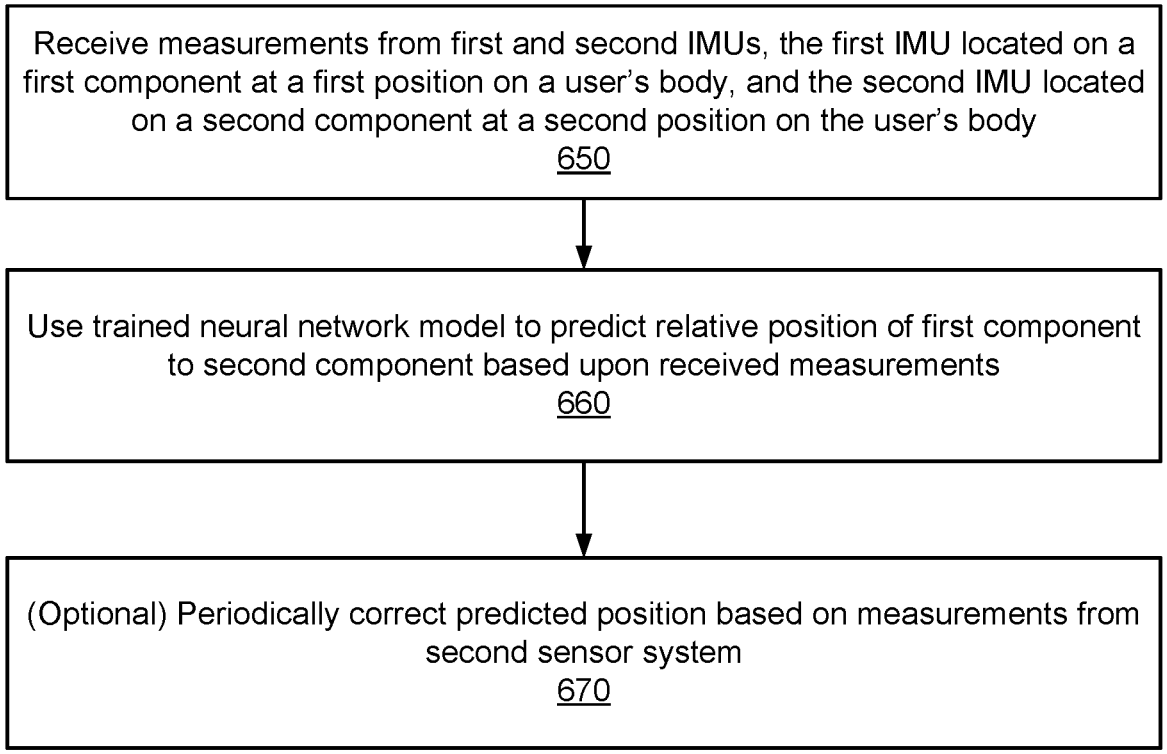
FIG. 6B is a flowchart illustrating a process for predicting relative positions of components using IMUs and a trained neural network model, in accordance with some embodiments.

FIGS. 6A and 6B illustrate flowcharts of processes for training and using a neural network model for predicting relative position of components of an artificial reality system using IMUs, in accordance with one or more embodiments. The processes shown in FIGS. 6A and 6B may be performed by components of an artificial reality system (e.g., artificial reality system 300 illustrated in FIG. 3). Other entities may perform some or all of the steps in FIGS. 6A and 6B in other embodiments. Embodiments may include different and/or additional steps, or perform the steps in different orders. In some embodiments, the processes of FIGS. 6A and 6B are performed by components of different artificial reality systems. For example, the training process of FIG. 6A may be performed using a first artificial reality system to train the neural network model, which may then be loaded onto a second artificial reality system to be used by an end user (e.g., based on the process of FIG. 6B). In some embodiments, the neural network model for the artificial reality system is pre-trained. For example, the neural network model may be initially trained as a default model, and downloaded to each a plurality of artificial reality systems.

FIG. 6A illustrates a flowchart of a process for training the neural network model for predicting relative positions between components using IMUs, in accordance with some embodiments. The artificial reality system receives 610, over a time period, positional information from a first IMU of a first component of the artificial reality system positioned at a first position on a user's body, and a second IMU of a second component of the artificial reality system positioned at a second position on the user's body. In some embodiments, the first component corresponds to an HMD worn on the head of the user, while the second component corresponds to a handheld controller held in a hand of the user. The received positional information may comprise a plurality of IMU measurement samples generated by the first and second IMUs over the time period, each indicating an angular rate and an acceleration of the first or second IMU. In some embodiments, the artificial reality system may further receive additional positional information for one or more additional sensors.

In some embodiments, the first and second components are positioned on a body of a training user, who may be instructed to move their body during the time period, such that the received positional information corresponds to different positions of the first and second components over the time period. For example, where the first and second components correspond to an HMD and a handheld controller, the user may turn their head and move their arm in various directions. In some embodiments, the artificial reality system may prompt the user to move their body in certain ways in order to achieve adequate coverage of different positions in the training data. In some embodiments, the user may perform a variety of different motions expected to be performed when controlling the artificial reality system. For example, in systems in which the user may perform predetermined gestures using the first and second components to generate action requests, the user may be prompted to perform such gestures to ensure they are reflected in the training data. In some embodiments, the system may prompt the user to perform additional types of motions that may not be directly related to controlling the artificial reality system, in order to capture a more diverse set of possible movements.

The artificial reality system receives 620, over the time period, positional information of the first and second components generated using a ground truth sensor system. In some embodiments, training of the neural network model may occur in a controlled environment where a ground truth sensor system is used to determine absolute positions of the first and second components in order to generate ground truth information for use in training the model. In some embodiments, the ground truth sensor system comprises one or more tracking cameras to capture images of the first and second components positioned at different positions on the user's body. In some embodiments, the first and second components may comprise one or more locators at specific positions on the first and second components, which may be used to determine a position of the first and second components using the captured images. In other embodiments, other types of sensor systems usable to determine positional information of the first and second components, e.g., a DCA implemented as part of the first and/or second component, one or more magnetic sensors, and/or the like, may be used. The positional information generated by the second sensor system may indicate absolute positions of the first and second components over the time period, which, combined with the IMU measurements from the first and second IMUs indicating angular rate and acceleration of the first and second IMUs over the time period, may form a training data set for training the neural network model.

The artificial reality system trains 630 the neural network model based on the received IMU measurements and ground truth information indicating the positions of the first and second components. The neural network model uses IMU data corresponding a predetermined time period (e.g., 1 second, 10 seconds, etc.), and predicts a relative motion of the second component relative to the first component over the predetermined time period. The predicted relative motion is used to determine a relative position of the first and second components, which is compared to the ground truth information indicating positions of the first and second components to generate feedback data for training the neural network model.

In addition, as discussed above, in some embodiments, the neural network model may be trained to predict a certain period of time into the future, e.g., for latency compensation purposes. In such cases, the predicted relative position of the first and second components is compared to ground truth data corresponding to position measured a set amount of time (e.g., between 10 and 100 ms) after the end of the predetermined time period, instead of at the end of the predetermined time period.

In some embodiments, the training method of FIG. 6A may be performed with over multiple time periods and/or with multiple training users, to generate a more diverse set of training data, such that the neural network model is applicable to a general population of potential users. In addition, in some embodiments, an end user of the artificial reality system may perform additional training on the neural network model, in order to calibrate the neural network model to more accurately reflect the body of the specific end user.

In some embodiments where the neural network model is configured to receive input sequences containing additional data beyond raw IMU measures (e.g., position parameters, velocity parameters, and/or other parameters received from one or more additional sensors), the neural network model may perform regularization during training to prevent the model from placing too much weight on specific parameters. For example, in some embodiments, if a weight value associated with a specific parameter becomes too large during training relative to weight values of other parameters, the weight value may be reduced or penalized, to ensure that the neural network model does not over rely on any single parameter.

FIG. 6B illustrates a flowchart of a method for position determination of components of an artificial reality system using IMUs, in accordance with some embodiments. The artificial reality system receives 650, as the user uses the artificial reality system, measurement data from the first and second IMUs indicating angular rate and acceleration information of the first and second IMUs. The first IMU is located on a first component of the artificial reality system positioned at a first position on a user's body (e.g., an HMD worn on the user's hand), while the second IMU is located on a second component of the artificial reality system positioned at a second position on the user's body (e.g., a handheld controller held in a hand of the user). In some embodiments, the artificial reality system may further receive additional measurement data for one or more additional sensors.

The artificial reality system uses 660 a trained neural network model (e.g., a neural network model trained using the process described in relation to FIG. 6A) to predict a relative position of the first and second components. In some embodiments, the neural network model uses as input IMU data corresponding to a predetermined time period (e.g., a previous 1 second, previous 10 seconds, etc.) to predict a motion of the second component relative to the first component during the time period. The predicted motion may be used to update an initial position and determine an updated relative position of the second component to the first component. In some embodiments, the initial position may be determined using a visual tracking system, or based upon a prompt to the user to initially orient the first and second components in a certain way (e.g., "touch your head with the controller to start"). In some embodiments, the system may use a past history of motion as determined by the neural network model as an indication of absolute position, or to deduce an initial position. For example, responsive to a determination that the controller moved 5 feet up, deducing that the controller was being held down, and it was moved up such that the arm is extended upwards.

In some embodiments, the neural network model may predict a relative position of the first and second components a certain period of time into the future, e.g., to predict future position/orientation with approximately 10-100 ms into the future, based on an expected level of latency. This is essentially a way to do pose extrapolation in time into the future, and absorb latency induced by the system, e.g., eliminating "perceived" latency or lag by predicting where the controller will be some period of time into the future. As discussed above, training the neural network model for future prediction requires no architectural change, but instead uses ground truth position data from x ms into the future for training instead of current position ground truth.

The artificial reality system optionally periodically adjusts 670 the determined relative position of the second component to the first component based on measurements from a second sensor system. In some embodiments, the second sensor system may comprise a tracking camera system, visual odometry system, magnetic sensors, or other type of sensor system usable to determine absolution position information of the first and second components. The second sensor system may be different from the ground truth sensor system used to generate the ground truth data for training the model described in relation to FIG. 6A. For example, in some embodiments, training of the neural network model may take place in a controlled environment prior to the artificial reality system being used by an end user (e.g., in a controller room having multiple high-resolution cameras), while the second sensor system may comprise one or more sensors located on the first or second components, or can be set up by the end-user of the artificial reality system.

In some embodiments, because the use of the neural network model to predict relative position and movement of the first and second components may limit an amount of error that is able to accumulate in determining the relative position between the first and second components, the second sensor system may be used to adjust the determined relative position less frequently in comparison to systems in which the positions of the components is determined by integrating the receiving IMU measurements, or be configured to run in a lower power or lower resolution mode. For example, in embodiments where the second sensor system comprises a camera system configured to capture images of the first and second components from which positional information of the first and second components can be determined, the camera system may comprise fewer cameras than the ground truth sensor system used for the initial training of the neural network model (e.g., as described in relation to FIG. 6A) and/or lower resolution cameras.

In addition, in some embodiments the artificial reality system may update the neural network model based upon measurements and/or positional information obtained using the second sensor system. For example, in some embodiments, the trained neural network model may initially correspond to a baseline or default model. As a specific end user uses the artificial reality system, the neural network model may be updated based on absolute position information determined using the second sensor system, to further train the neural network model based on the body of the specific user.

Figure 7:
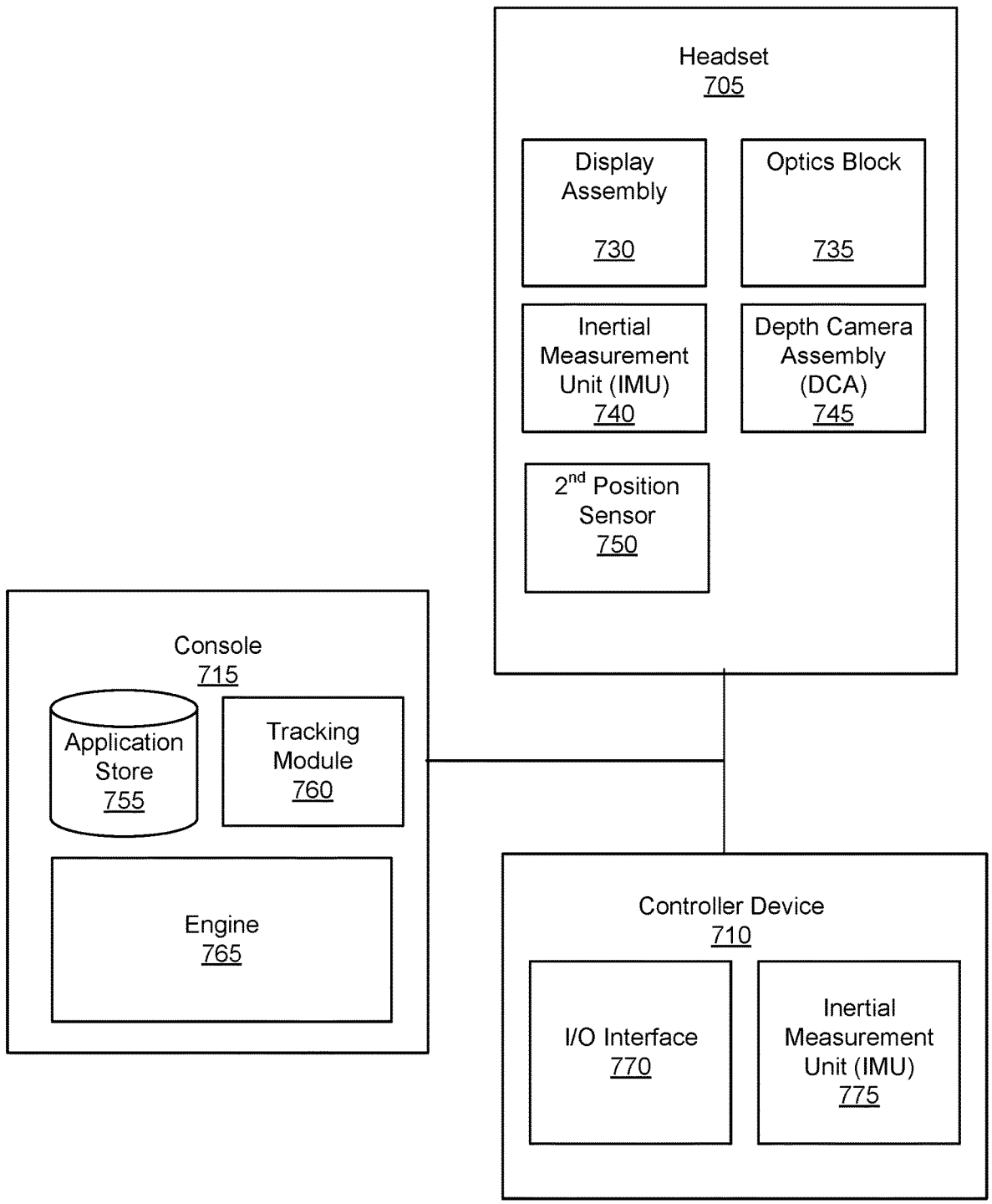
FIG. 7 is a system that includes a headset and controller device, in accordance with one or more embodiments.

FIG. 7 illustrates an artificial reality system 700, in accordance with one or more embodiments. In some embodiments, the artificial reality system 700 comprises a headset 705 which may correspond to the headset 102 of FIG. 1A or the HMD 106 of FIG. 1B, and a controller device 710 which may correspond to the handheld controller 200 of FIG. 2. The artificial reality system 700 may operate in a virtual reality environment, an augmented reality environment, a mixed reality environment, or some combination thereof. The headset 705 and the controller device 710 may be coupled to a console 715. While FIG. 7 shows an example system 700 including one headset 705 and one controller device 710, in other embodiments any number of these components may be included in the system 700. For example, in some embodiments a user may wear the headset 705 while also operating two different controller devices 710 (e.g., one in each hand). In some embodiments, there may be multiple headsets each having an associated controller device 710, with each headset and controller device 710 communicating with the console 715. In alternative configurations, different and/or additional components may be included in the system 700 (e.g., an audio system for providing audio content to the user). Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes the display assembly 730, an optics block 735, one or more position sensors 740, and a DCA 745. Some embodiments of headset 705 have different components than those described in conjunction with FIG. 7. Additionally, the functionality provided by various components described in conjunction with FIG. 7 may be differently distributed among the components of the headset 705 in other embodiments, or be captured in separate assemblies remote from the headset 705.

The display assembly 730 displays content to the user in accordance with data received from the console 715. The display assembly 730 displays the content using one or more display elements (e.g., the display elements 120 illustrated in FIG. 1A). A display element may be, e.g., an electronic display. In various embodiments, the display assembly 730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMO-LED), a waveguide display, some other display, or some combination thereof. Note in some embodiments, the display element 730 may also include some or all of the functionality of the optics block 735.

The optics block 735 may magnify image light received from the electronic display, corrects optical errors associated with the image light, and presents the corrected image light to one or both eyeboxes of the headset 705. In various embodiments, the optics block 735 includes one or more optical elements. Example optical elements included in the optics block 735 include: an aperture, a Fresnel lens, a convex lens, a concave lens, a filter, a reflecting surface, or any other suitable optical element that affects image light. Moreover, the optics block 735 may include combinations of different optical elements. In some embodiments, one or more of the optical elements in the optics block 735 may have one or more coatings, such as partially reflective or anti-reflective coatings.

Magnification and focusing of the image light by the optics block 735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 735 corrects the distortion when it receives image light from the electronic display generated based on the content.

The IMU 740 may correspond to the IMU 190 illustrated in FIGS. 1A and 1B, and comprises at least one accelerometer to measure translational motion (forward/back, up/down, left/right) and at least one gyroscope to measure rotational motion (e.g., pitch, yaw, roll). In some embodiments, the IMU 740 rapidly samples the measurement signals of the accelerometer and gyroscope to generate measurements usable to calculate a position of the headset 705. For example, the generated measurements may be used as input to a trained neural network model (e.g., maintained by a tracking module 760) to predict a position of a reference point on the headset 705 (e.g., a relative position to another component on the user's body, such as the controller device 710). The reference point is a point that may be used to describe the position of the headset 705. While the reference point may generally be defined as a point in space, however, in practice the reference point is defined as a point within the headset 705.

The DCA 745 generates depth information for a portion of the local area. The DCA includes one or more imaging devices and a DCA controller. The DCA 745 may also include an illuminator. Operation and structure of the DCA 745 is described above with regard to FIG. 1A.

In some embodiments, the headset 705 further comprises a second position sensor 750 configured to generate data indicating a position of the headset 705. In some embodiments, the second position sensor 750 is configured to determine an absolute position of the headset 705, e.g., a position of the headset 705 relative to a static reference point in the surrounding environment (e.g., corresponding to the console 715, a fixed point in a room, etc.). In some embodiments, the second position sensor 750 may be implemented as part of the DCA 745, in which the position of the headset 705 may be determined based upon the generated depth information. In other embodiments, instead of a second position sensor 750 included as part of the headset 705, the second sensor system may comprise a separate camera system configured to capture images of the headset 705 to determine the position and/or orientation of the headset 705. For example, in some embodiments, the headset 705 may include one or more locators, which may be used by the determine a position of the headset 705 using images captured by the camera system.

The controller device 710 may correspond to a handheld device such as a handheld controller (e.g., the handheld controller 200 of FIG. 2), and is a device that allows a user to send action requests and receive responses from the console 715. An action request is a request to perform a particular action. For example, an action request may be an instruction to start or end capture of image or video data, or an instruction to perform a particular action within an application. In some embodiments, the user sends action requests using an I/O interface 770 of the controller device 710, which may include one or more input elements, such as one or more buttons, triggers, joysticks, etc. In addition, in some embodiments, an action request may be sent based upon a movement or position of the controller device 715 (e.g., determined based upon the IMU 775 of the controller device 710). An action request is communicated to the console 715, which performs an action corresponding to the action request. In some embodiments, the I/O interface 770 may provide haptic feedback to the user in accordance with instructions received from the console 715. For example, haptic feedback is provided when an action request is received, or the console 715 communicates instructions to the controller device 710 causing the I/O interface 770 to generate haptic feedback when the console 715 performs an action.

The IMU 775 of the controller device 710 may be similar to the IMU 740 of the headset 705, comprising at least one accelerometer to measure translational motion (forward/back, up/down, left/right) and at least one gyroscope to measure rotational motion (e.g., pitch, yaw, roll). The IMU 775 rapidly samples the measurement signals of the accelerometer and gyroscope to generate measurements usable to calculate a position of the controller device 710. For example, the generated measurements may be used as input to a trained neural network model (e.g., maintained by the tracking module 760 of the console 715) to predict a position of a reference point on the controller device 710 (e.g., a relative position to another component on the user's body, such as the headset 705). The reference point is a point that may be used to describe the position of the controller device 710. While the reference point may generally be defined as a point in space, however, in practice the reference point is defined as a point within the headset 705.

The console 715 provides content to the headset 705 for processing in accordance with information received from the headset 705 and the controller device 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the controller device 710 (e.g., action requests received at the I/O interface 770). Examples of applications include: gaming applications, conferencing applications, video playback applications, or other suitable applications.

The tracking module 760 tracks movements of the headset 705 and the controller device 710 using information from IMUs 740 and 775. The tracking module 760 comprises a trained neural network model configured to receive measurement data captured by the IMUs 740 and 775 over a predetermined time period, and predict a relative motion of the controller device 710 relative to the headset 705 over the time period. The tracking module 760 uses the predicted motion to determine a relative position of the controller device 710 to the headset 705. In some embodiments, the trained neural network model may correspond to the neural network model 400 illustrated in FIG. 4, and is trained based on the process illustrated in FIG. 5A. Although FIG. 7 illustrates the tracking module as located on the console 715, it is understood that in some embodiments, at least a portion of the tracking module may be implemented on a different device, such as the headset 705.

In some embodiments, the tracking module 760 may further be configured to periodically adjust one or more relative positions determined using the trained neural network model using position information determined based upon the DCA 745, the second position sensor 750, or some combination thereof. For example, the tracking module 760 determines a position of a reference point of the headset 705 in a mapping of a local area based on information from the headset 705. The tracking module 760 may also determine positions of an object or virtual object.

Additionally, in some embodiments, the tracking module 760 may use portions of data indicating a position of the headset 705 and/or controller device 710 (e.g., as determined using the trained neural network model), the second position sensor 760, and/or representations of the local area from the DCA 745, to predict a future location of the headset 705. The tracking module 760 provides the estimated or predicted future position of the headset 705 or the controller device 710 to the engine 765.

The engine 765 executes applications and receives position information, acceleration information, velocity information, predicted future positions, or some combination thereof, of the headset 705 and/or controller device 710 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the controller device 710 and provides feedback to the user that the action was performed. The provided feedback may be visual or audible feedback via the headset 705 or haptic feedback via the controller device 710.

One or more components of system 700 may contain a privacy module that stores one or more privacy settings for user data elements. The user data elements describe the user or the headset 705. For example, the user data elements may describe a physical characteristic of the user, an action performed by the user, a location of the user of the headset 705, a location of the headset 705, an HRTF for the user, etc.

Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 700 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:
    a first component configured to be positioned at a first portion of a user's body, the first component comprising at least a first inertial measurement unit (IMU) configured to generate first measurements indicating motion of the first component;
    a second component configured to be positioned at a second portion of the user's body, comprising a least a second IMU configured to generate second measurements indicating motion of the second component, wherein a set of potential positions of the first component and the second component is determined by physiological constraints of the first portion and the second portion of the user's body; and
    a controller configured to:
        receive first measurements from the first IMU and the second measurements from the second IMU, and
        predict, using a trained neural network model trained using the set of potential positions, a position of the first component relative to the second component corresponding to an expected future position of the first component relative to the second component at a future time.

2. The system of claim 1, wherein the first component is a head-mounted device (HMD) configured to be worn on the user's head, and the second component is a handheld device configured to be held in a hand of the user.

3. The system of claim 1, where the controller is configured to receive ground truth information for training the neural network model from a camera system configured to capture images of the first component and the second component.

4. The system of claim 3, wherein the ground truth information comprises position information of the first component and the second component corresponding to a time after a time period during which measurements from the first IMU and the second IMU are received.

5. The system of claim 1, wherein the controller is further configured to periodically receive information indicating positions of the first and second components from an additional sensor, and to periodically use the received information to correct an error of the predicted position.

6. The system of claim 1, wherein the trained neural network model is configured to:
receive a set of first measurements from the first IMU and a set of second measurements from the second IMU corresponding to a predetermined period of time; and
predict a motion of the first component relative to the second component over the predetermined period of time;
wherein the controller is further configured to predict the position of the first component relative to the second component by updating an initial position based upon the motion predicted by the trained neural network model.

7. The system of claim 1, wherein the trained neural network is configured to:
receive a set of first measurements from the first IMU and a set of second measurements from the second IMU corresponding to a predetermined period of time; and
predict an expected motion of the first component relative to the second component over a future time period following the predetermined period of time;
wherein the controller is further configured to predict the position of the first component relative to the second component by updating an initial position based upon the motion predicted by the trained neural network model, and wherein the position corresponds to the expected future position of the first component relative to the second component.

8. The system of claim 7, wherein the trained neural network is configured to:
receive velocity information indicating a current velocity of the first component relative to the second component;
extrapolate an expected future position estimate using the received velocity information corresponding to a future point in time;
predict an expected offset from the expected future position estimate corresponding to the future point in time; and
apply the expected offset to the expected future position estimate to predict the expected future position of the first component relative to the second component at the future point in time.

9. The system of claim 1, wherein the trained neural network model is a long short-term memory (LTSM) network which when unrolled matches a length of a set of first measurements from the first IMU and a set of second measurements from the second IMU corresponding to a predetermined period of time.

10. The system of claim 1, wherein the trained neural network model is a convolutional neural network (CNN) model.

11. The system of claim 1, wherein the controller is further configured to:
track positions of the first component and second component based upon received information indicating positions of the first and second components from an additional sensor;
compare the predicted position of the first component relative to the second component predicted using the trained neural network model to the positions of the first and second components received from the additional sensor;
determine whether the additional sensor has lost tracking, based upon the comparison; and
responsive to determining that the additional sensor has lost tracking, adjust the tracked positions of the first component and second component based on the predicted position.

12. A method comprising:
receiving, from a first inertial measurement unit (IMU), first measurements indicating motion of a first component, wherein the first component is positioned at a first portions of a user's body;
receiving, from a second IMU, second measurements indicating motion of a second component positioned at a second portion of the user's body, wherein a set of potential positions of the first component and the second component is determined by physiological constraints of the first portion and the second portion of the user's body; and
predicting, using a trained neural network model trained using the set of potential positions, a position of the first component relative to the second component corresponding to an expected future position of the first component relative to the second component at a future time.

13. The method of claim 12, wherein the first component is a head-mounted device (HMD) configured to be worn on the user's head, and the second component is a handheld device configured to be held in a hand of the user.

14. The method of claim 12, further comprising:
at the trained neural network model:
receiving a set of first measurements from the first IMU and a set of second measurements from the second IMU corresponding to a predetermined period of time,
predicting a motion of the first component relative to the second component over the predetermined period of time; and
predicting the position of the first component relative to the second component by updating an initial position based upon the motion predicted by the trained neural network model.

15. The method of claim 12, further comprising:
at the trained neural network model:
receiving a set of first measurements from the first IMU and a set of second measurements from the second IMU corresponding to a predetermined period of time, predicting an expected motion of the first component relative to the second component over a future time period following the predetermined period of time; and predicting the position of the first component relative to the second component by updating an initial position based upon the motion predicted by the trained neural network model, wherein the position corresponds to the expected future position of the first component relative to the second component.

16. The method of claim 12, further comprising:

tracking positions of the first component and second component based upon received information indicating positions of the first and second components from an additional sensor;

comparing the predicted position of the first component relative to the second component predicted using the trained neural network model to the positions of the first and second components received from the additional sensor;

determining whether the additional sensor has lost tracking, based upon the comparison; and responsive to determining that the additional sensor has lost tracking, adjusting the tracked positions of the first component and second component based on the predicted position.

17. A computer readable non-transitory storage medium, storing instructions for:

receiving, from a first inertial measurement unit (IMU), first measurements indicating motion of a first component, wherein the first component is positioned at a first portions of a user's body;

receiving, from a second IMU, second measurements indicating motion of a second component positioned at a second portion of the user's body, wherein a set of potential positions of the first component and the second component is determined by physiological constraints of the first portion and the second portion of the user's body; and predicting, using a trained neural network model and the set of potential positions, a position of the first component relative to the second component corresponding to an expected future position of the first component relative to the second component at a future time.

18. The computer readable non-transitory storage medium of claim 17, wherein the first component is a head-mounted device (HMD) configured to be worn on the user's head, and the second component is a handheld device configured to be held in a hand of the user.

* * * * *